V. DRAPER.
Device for Swaging Chain Links.
No. 3,858. Reissued March 1, 1870.
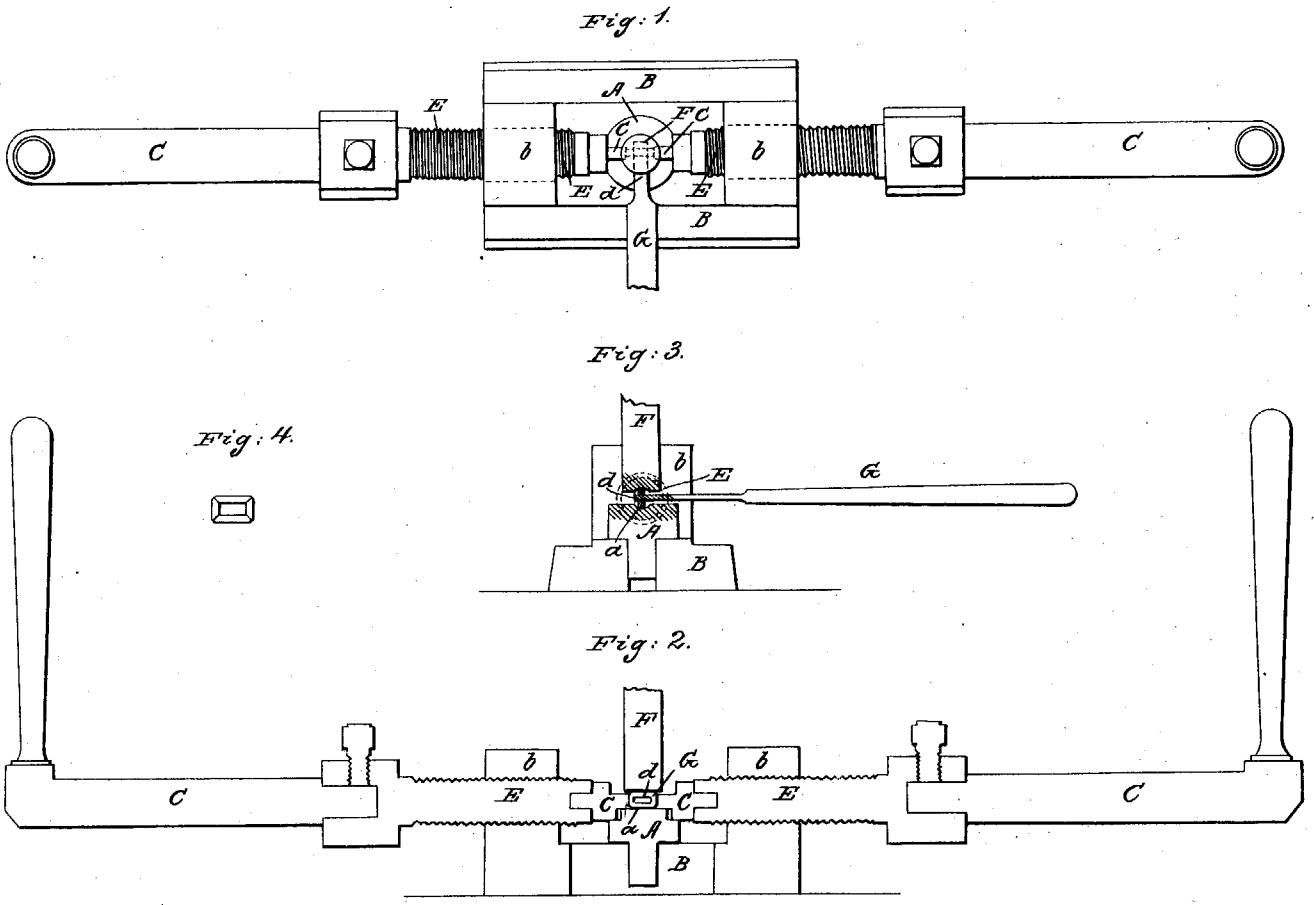
Witnesses:
Frederick Curtis
J. N. Terry.
Inventor:
Virgil Draper.
by his attorney:
R. H. Eddy.
N. PETERS, Photo-Lithographer, Washington, D. C.

United States Patent Office.

OSCAR M. DRAPER, OF NORTH ATTLEBOROUGH, MASSACHUSETTS, ASSIGNEE OF VIRGIL DRAPER.

*Letters Patent No.* 50,200, *dated September* 26, 1865; *reissue No.* 3,858, *dated March* 1, 1870.

IMPROVED DEVICE FOR SWAGING CHAIN-LINKS.

The Schedule referred to in these Letters Patent and making part of the same.

*To all whom it may concern:*

Be it known that VIRGIL DRAPER, of North Attleborough, in the county of Bristol, and State of Massachusetts, has invented an Improved Mechanism for Swaging Chain-Links; and it is hereby declared that the following specification, taken in connection with the drawings making a part of the same, is a full, clear, and exact description thereof.

Figure 1 denotes a top view;

Figure 2, a longitudinal and vertical section; and

Figure 3, a transverse and vertical section of the said invention.

The object of the said machine is to swage a round or other shaped link into one of different form and more perfect outline, as shown in Figure 4.

The invention resides in the employment of suitable devices for giving shape to the outside of the link, in combination with a former or movable die-block to give shape to the inside of the link. The devices for controlling the form of the outside of the link are: first, a stationary bed-die; second, adjustable compressing-dies; and third, a punch or plunger operated by power.

The mode of operation by which the formation of the link is effected is that which results from striking the link a blow upon one side sufficiently powerful to change the disposition of its particles of metal while under confinement within a mold.

In the drawings—

A is a bed-die, which is suitably supported within a frame, B. This bed-die has a channel or groove, *a*, extending across its upper face, and serves to receive and guide two end dies or compressers, *c c*, which are laid within the said groove.

The said compressers are operated by the male screws E E, and can be made to advance or recede upon turning such screws in a well-understood way. These screws extend horizontally through and are screwed into standards *b b* of or making part of the frame B; and each screw has a handle or crank, *c*, applied to it, to enable it to be easily revolved and with sufficient force to contract the links in longitudinal directions.

An upper die or punch, F, is employed over the bed-die A, the lower or working-end of such punch being made with a channel to fit the link.

Furthermore, with the afore-described parts there is employed an interior former or movable die-block, which, in this instance, is a prismatic piece of steel, *d*, attached to a handle, G. This projection is quadrilateral, or of the form which it is intended the interior of the link shall be. It is to be inserted within the link to which it is to fit closely, and its office is to mold the interior surface of the link when the blow to swage the link is struck.

In using the said mechanism, after the link has been placed in the bed-die, the compressing-dies are to be screwed up against the link, and the punch is to be driven down upon it with sufficient force to swage the link into the form desired. If desirable, the dies and punch may be chased or engraved, so as to produce a figure or ornamental surface on the edges of the link.

What is claimed as the invention of the said VIRGIL DRAPER, is—

A mechanism for swaging chain-links and other like articles, which consists of a bed-die, A, a punch, F, and compressing-dies *c c*, in combination with an interior forming die-block, *d*, substantially as described.

O. M. DRAPER.

Witnesses:

EDWARD C. AMES,

PETER F. HUGHES.